United States Patent
Araújo

(10) Patent No.: US 10,977,141 B2
(45) Date of Patent: *Apr. 13, 2021

(54) SYSTEMS AND METHODS FOR HANDLING SERVER FAILOVERS

(71) Applicant: Fastly, Inc., San Francisco, CA (US)

(72) Inventor: João Diogo Taveira Araújo, Oporto (PT)

(73) Assignee: Fastly, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,509

(22) Filed: Aug. 1, 2019

(65) Prior Publication Data

US 2019/0354449 A1 Nov. 21, 2019

Related U.S. Application Data

(63) Continuation of application No. 15/402,655, filed on Jan. 10, 2017, now Pat. No. 10,372,564, which is a continuation of application No. 14/291,318, filed on May 30, 2014, now Pat. No. 9,569,318.

(51) Int. Cl.

| G06F 11/00 | (2006.01) |
|---|---|
| G06F 11/20 | (2006.01) |
| H04L 7/00 | (2006.01) |
| H04L 12/741 | (2013.01) |
| H04L 29/08 | (2006.01) |
| H04L 29/12 | (2006.01) |

(52) U.S. Cl.
CPC ...... *G06F 11/2025* (2013.01); *G06F 11/2023* (2013.01); *G06F 11/2035* (2013.01); *G06F 11/2041* (2013.01); *G06F 11/2048* (2013.01); *H04L 7/0079* (2013.01); *H04L 45/745* (2013.01); *H04L 67/10* (2013.01); *H04L 61/103* (2013.01); *H04L 61/6022* (2013.01)

(58) Field of Classification Search
CPC ............ G06F 11/1423; G06F 11/1425; G06F 11/2023; H04L 67/1034; H04L 67/1044
See application file for complete search history.

(56) References Cited

U.S. PATENT DOCUMENTS

| 6,081,586 A | 6/2000 | Rahamim et al. |
|---|---|---|
| 6,182,139 B1 | 1/2001 | Brendel |
| 6,601,101 B1 | 7/2003 | Lee et al. |
| 8,078,755 B1 | 12/2011 | Liu et al. |

(Continued)

*Primary Examiner* — Elmira Mehrmanesh

(57) ABSTRACT

Described herein are methods, systems, and software for accommodating failover of a content node in a content delivery network. In one example, a method of operating a content node includes receiving a communication for an end user device from a control node, wherein an interrupted content node previously handled the communication. The method further includes determining if the communication includes a synchronization packet and identifying connection information for the communication. The method also provides, if the communication includes a synchronization packet, accepting the communication and handling delivery for the end user device. The method also includes, if the communication does not include the synchronization packet, determining if a match exists between the connection information for the communication and connection information stored in a flow table, and handling the communication based on the match.

20 Claims, 11 Drawing Sheets

(56) References Cited

U.S. PATENT DOCUMENTS

| | | |
|---|---|---|
| 8,341,295 B1 | 12/2012 | Liu et al. |
| 9,569,318 B2 | 2/2017 | Araujo |
| 10,372,564 B2 * | 8/2019 | Ara jo ................ G06F 11/2041 |
| 2001/0056490 A1 | 12/2001 | Nagami et al. |
| 2003/0174648 A1 | 9/2003 | Wang et al. |
| 2007/0027976 A1 | 2/2007 | Sasame et al. |
| 2010/0318665 A1 | 12/2010 | Demmer et al. |
| 2011/0225311 A1 | 9/2011 | Liu et al. |
| 2011/0231515 A1 | 9/2011 | Day et al. |
| 2012/0113901 A1 | 5/2012 | Jackson et al. |
| 2013/0163598 A1 | 6/2013 | Jacobson et al. |
| 2013/0304892 A1 | 11/2013 | Afergan et al. |

* cited by examiner

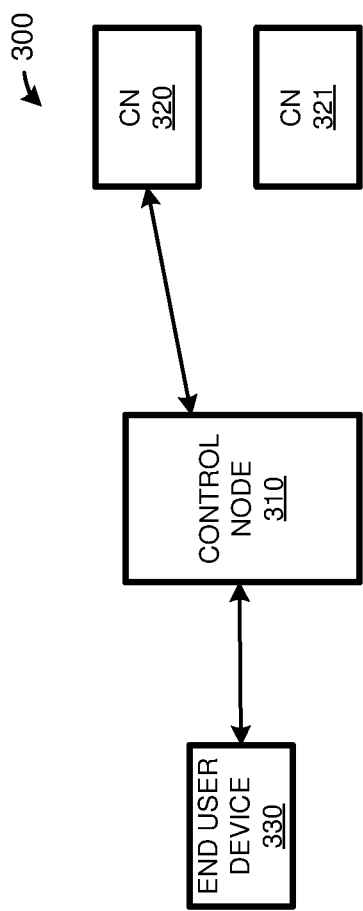
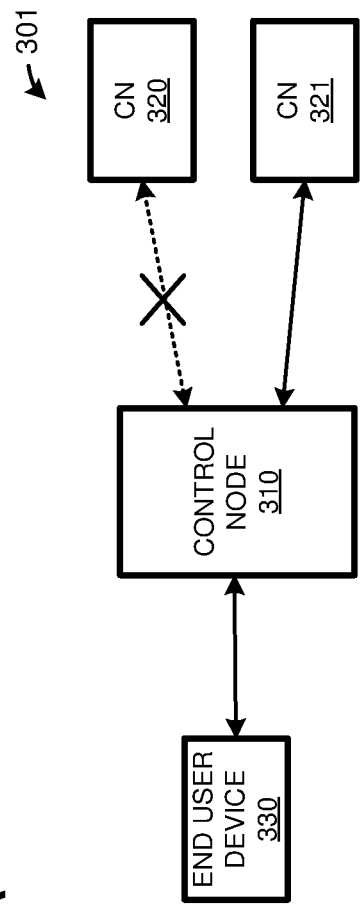
FIGURE 3A
FIGURE 3B

| FLOW TABLE 800 | | | | |
|---|---|---|---|---|
| SOURCE ADDRESS 810 | DESTINATION ADDRESS 820 | SOURCE PORT 830 | DESTINATION PORT 840 | OTHER INFORMATION 850 |
| . . . . . . . . | . . . . . . . . | . . . . . . . . | . . . . . . . . | . . . . . . . . |

FIGURE 8

SYSTEMS AND METHODS FOR HANDLING SERVER FAILOVERS

RELATED APPLICATIONS

This application is a continuation of, and claims priority to, U.S. Pat. No. 10,372,564, granted on Aug. 6, 2019, and entitled FAILOVER HANDLING IN A CONTENT NODE OF A CONTENT DELIVERY NETWORK, which is a continuation of U.S. Pat. No. 9,569,318, entitled the same, granted on Feb. 14, 2017, which is hereby incorporated by reference in its entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include hosting servers, which host network content of content creators or originators, such as web servers for hosting a news website. However, these originating computer systems can become overloaded and slow due to frequent requests of content by end users.

To assist the origin servers, content delivery networks have been developed that create a layer of caching between the origin servers and the end users. These content delivery networks typically have one or more content nodes, or cache nodes, distributed across a large geographic region to provide faster and lower latency access to the content for the end users. In operation, content from the origin servers can be cached into the content nodes, and can be requested via the content nodes from the origin server when the content has not yet been cached.

In some examples, multiple content nodes may be grouped in one physical location to provide content to end user devices. These locations, or points of presence, may include highly populated cities, central data request locations, or any other geographic location that may require multiple content nodes. These content nodes can individually serve content to end users during associated communication sessions. However, when a particular content node experiences a service interruption or failure, any associated communication sessions can lead to content delivery interruptions to end users.

OVERVIEW

Methods, systems, and software are included for providing data to users during content node failures. In one example, a method of operating a content node includes receiving a communication for an end user device from a control node, wherein an interrupted content node previously handled the communication. The method further includes determining if the communication includes a synchronization packet and identifying connection information for the communication. The method also provides, if the communication includes a synchronization packet, accepting the communication and handling delivery for the end user device. The method also includes, if the communication does not include the synchronization packet, determining if a match exists between the connection information for the communication and connection information stored in a flow table, and handling the communication based on the match.

In a further instance, a computer apparatus to operate a content node in a content delivery network includes processing instructions that direct the content node to receive a communication from a control node, the communication corresponding to a content request issued by an end user device previously handled by the interrupted content node. The processing instructions also direct the content node to determine if the communication includes a synchronization packet and identify connection information for the communication. The processing instructions further direct the content node to, if the communication includes the synchronization packet, accept the communication, add the connection information for the communication to a flow table, and handle content delivery for the end user device instead of the interrupted content node based at least on the flow table. The processing instructions also direct the content node to, if the communication does not include the synchronization packet, determine if a match exists between the connection information for the communication and connection information stored in the flow table, and handling the communication based on the match. The computer apparatus also includes one or more non-transitory computer readable media that store the processing instructions.

In another example, a content delivery network to transition communications to a content node from an interrupted content node includes a control node configured to transfer a communication to a content node, the communication corresponding to a content request issued by an end user device previously handled by the interrupted content node. The system further includes the content node configured to receive the communication and determine if the communication includes a synchronization packet and identify connection information for the communication. The content node is further configured to, if the communication includes the synchronization packet, accept the communication, add the connection information for the communication to a flow table, and handle content delivery for the end user device instead of the interrupted content node based at least on the flow table. The content node is also configured to, if the communication does not include the synchronization packet, determine if a match exists between the connection information for the communication and connection information stored in the flow table, and handling the communication based on the match.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 3A illustrates an operational scenario for operating a control node during a content node interruption.

FIG. 3B illustrates an operational scenario for operating a control node during a content node interruption.

FIG. 8 illustrates a flow table for an alternative content node.

DESCRIPTION

Figure 1:
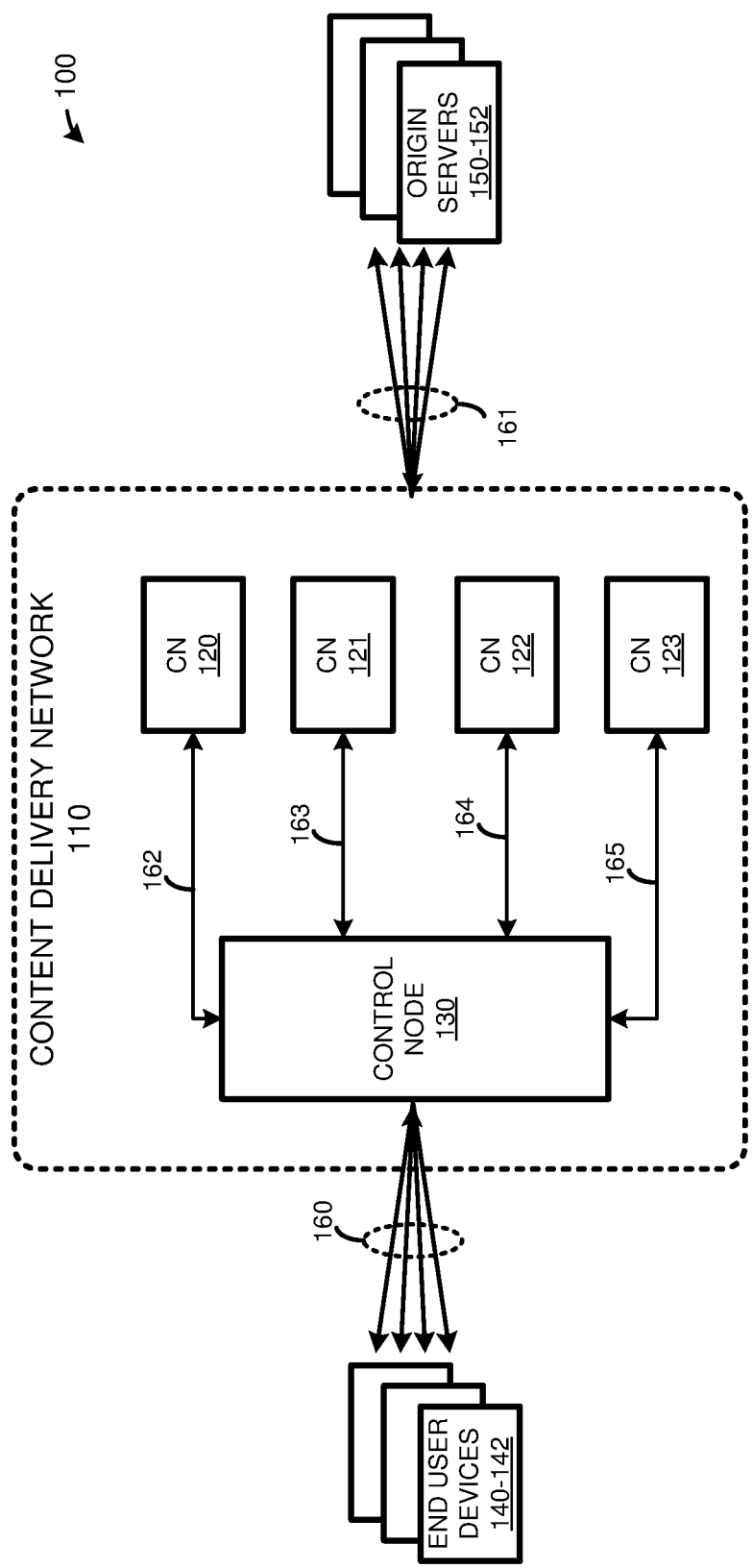
FIG. 1 illustrates a communication system for providing content to end user devices via a control node.

Network content, such as web page content, typically includes content such as text, hypertext markup language (HTML) pages, pictures, video, audio, animations, code, scripts, or other content viewable by an end user in a browser or other application. This various network content can be stored and served by origin servers and equipment. However, when a content delivery network is employed, the content delivery network can act as a proxy to cache content delivery between origin servers and the end user devices.

Content delivery networks can add a layer of caching between origin servers of the content providers and the end users. The content delivery networks typically have one or more content nodes, or cache nodes, distributed across a large geographic region to provide faster and lower latency local access to the content for the end users. When end users request content, such as a web page, a locally proximate content node will respond to the content request instead of the associated origin server. Various techniques can be employed to ensure the content node responds to content requests instead of the origin servers, such as associating web content of the origin servers with network addresses of the content nodes.

In many examples, multiple network content sources are handled by a single content node. For example, a content node can be configured to cache website content of many different websites of many different website content originators. A content node may further only cache portions of the original content source to provide the most frequently accessed content to the end user devices. As a result, content and data objects that are stored on the content node may need to be purged and updated to reflect changes in the source content, to reflect changes in the requests from the end user devices, or for a variety of other purposes.

In some examples, a plurality of content nodes may be situated at a common site in densely trafficked request areas, such as cities, to provide content to the end users without being burdened by the number of requests. To handle the incoming data requests, each content node may communicate with a control node or switch that directs each of the requests to the various content nodes. This control node may, in some examples, include a load-balancing module, such as an equal-cost multi-path (ECMP) module, that is used to balance the requests amongst the various content nodes that are connected in the system.

Although the control node initially is configured to spread the data requests amongst all of the nodes that are connected in the system, a control node may be interrupted in some examples. This interruption may occur when a content node itself is unable to respond to data requests, when the communication path between the control node and the content node is interrupted, when an administrator or some other management process initiates an interruption with the node, or any other possible interruption. When this interruption occurs between the control node and the content node, the control node is configured to identify the existence of the issue and initiate the transition or drain of communications from the content node to one or more alternative content nodes.

To further illustrate the transition from an interrupted content node, FIG. 1 is included. FIG. 1 illustrates a communication system 100 for providing content to end user devices via a control node. Communication system 100 includes content delivery network 110, end user devices 140-142, and origin servers 150-152. Content delivery network 110 further includes control node 130 and content nodes (content nodes) 120-123. End user devices 140-142 communicate with control node 130 over communication links 160. Origin servers 150-152 provide data to content nodes 120-123 over communication links 161. Control node 130 communicates with content nodes 120-123 over communication links 162-165.

In operation, content nodes 120-123 cache content provided by origin servers 150-152. This cached content may include web pages, pictures, movies, or any other similar content that may be requested by end user devices 140-142. In some instances, content nodes 120-123 may only cache a portion of the total content that is available on origin servers 150-152, such as the most recently accessed or most popular data for the end users. Accordingly, if an end user device requests content that is not available on content nodes 120-123, the content may be retrieved from the proper origin server and supplied to the end user. Further, once the data is retrieved, the data may be cached in one of content nodes 120-123 to be supplied in response to future requests.

In the present example, content nodes 120-123 communicate with end user devices 140-142 using control node 130. Control node 130 is configured to direct and spread content requests from the end user devices amongst the available content nodes. Accordingly, control node 130 may act as a load balancer to ensure that each of content nodes 120-123 is not inundated or overloaded with data requests from the end users. For example, a first data request by end user device 140 may be directed by control node 130 to content node 120, whereas the next request from end user device 141 may be directed to content node 122.

In addition to providing load balancing and directing the communications for content nodes 120-123, control node 130 also detects interruptions or failures of the various content nodes. To detect interruptions, control node 130 may query or periodically receive updates from content nodes 120-123 to identify if content node has failed or the communication path is interrupted. If communications are interrupted, control node 130 may direct communications that initiated with the failed content node to one or more other content nodes. To accomplish this task, control node 130 may include virtual next hop network addresses that direct each of the communications to the appropriate content node of content nodes 120-123. These virtual next hop network addresses may comprise virtual Internet Protocol (IP) address that might not correspond to physical interfaces or physical network nodes, but are rather associated to special media access control (MAC) or link layer addresses that are configured by the control node to communicate with each of the content nodes. These MAC addresses may be used to define the proper content node to process a content request, but may also be used to identify the origin of the request. For example a first MAC address could be used by a content node to identify communications that are intended for that node, however, a second MAC address could be used by a content node to identify communications that were intended for another content node.

Figure 2:
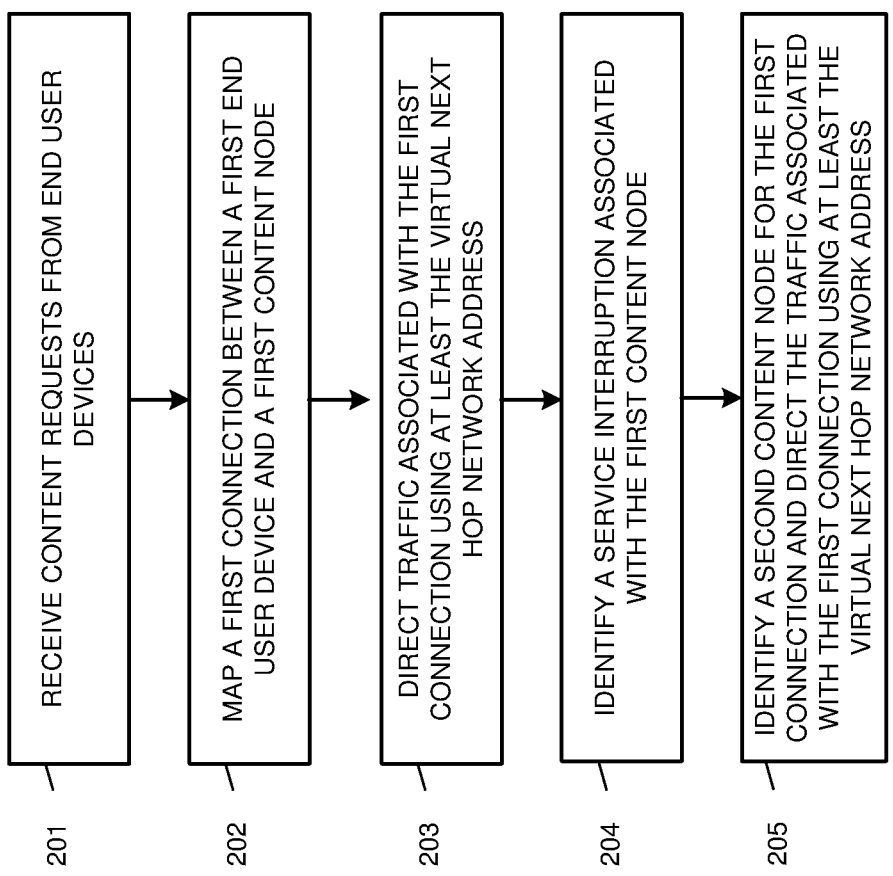
FIG. 2 illustrates the operation of a control node during a content node interruption.

To further illustrate the directing of content node communications upon a content node interruption, FIG. 2 is provided. FIG. 2 illustrates the operation of a control node during a content node interruption. The operations of FIG. 2 are referenced parenthetically below.

In operation, a control node receives content requests issued by end user devices for content cached by a plurality of content nodes of a content delivery network (201). For at least a first content request, the control node maps a first connection between a first end user device and a first content node, wherein the first connection is defined by at least a network address of the first end user device and virtual next hop network address (202). In some examples the network address and the virtual next hop network address comprise IP addresses that are used to set up the communication. Once the mapping is complete, the control node directs traffic associated with the first connection to the first content node using at least the virtual next hop network address (203). For example, an end user device may require content served from one of the content delivery nodes. As a result of this requirement, the end user device contacts the control node using a common network address that is used for all of the content delivery nodes communicatively coupled to the control node. In response to receiving the request, the control node identifies a virtual next hop address for the communication using a distributed algorithm to spread the content requests amongst the available content nodes. Once a virtual next hop network address is identified, the next hop network address is matched to an initial MAC or link layer address for the particular node, and the request is passed to the particular node.

Continuing with FIG. 2, the control node identifies a service interruption associated with the first content node (204). This service interruption may occur as a result of an issue in the communication link, an issue in the content node itself, a planned interruption for maintenance by an administrator or management process, or for any other related problem with the content node. Once an issue is identified, the control node identifies a second content node to handle the first connection and directs the traffic associated with the first connection the second content node using at least the virtual next hop address (205).

Referring to FIG. 1 as an example, a communication between an end user device and content node 120 may be interrupted, preventing the end user device from accessing content from content node 120. Responsive to the interruption, control node 130 maps the virtual next hop network address for the communication to an alternative content node, such as content node 121. For instance, the virtual next hop network address may initially be mapped to MAC address 1.1. Responsive to the interruption, the virtual next hop network address may be mapped to MAC address 1.2 that corresponds to content node 121. Thus, communications are no longer passed between the end user device and content node 120.

In some examples, the MAC addresses used to contact each of the content nodes may include various encoded information that can be used to by the content nodes to identify characteristics of the communication. Such encoded information may include an identity for the previous content node (if any) used in the communication, the identity of the current content node, the type of traffic for the communication, the network interface for the current content node, whether the communication is being drained or transferred from another node, or any other similar information.

Referring now to FIGS. 3A and 3B, FIGS. 3A and 3B illustrate operational scenarios 300-301 for operating a control node during a content node interruption. Operational scenarios 300-301 include control node 310, content nodes (content nodes) 320-321, and end user device 330.

In operation, control node 310 and content nodes 320-321 may exist within a content delivery network to provide various types of content to end user devices. As depicted in the present example, end user device 330 communicates with control node 310 to request content from the various content delivery nodes. In some instances, control node 310 may possess a network address that is shared by all content nodes that are communicatively coupled to control node 310. As a result, rather than contacting each of the content nodes directly, the end user devices contact control node 310 initially to request content. Responsive to a request by end user device 330, control node 310 uses a balancing process or algorithm to determine virtual next hop network address for a content node to handle the request. Once the process defines the virtual next hop network address, the address is matched, using an Address Resolution Protocol (ARP) protocol table, to a MAC address for the destination content node. In the present example, control node 310 matches the next hop network address to a MAC address for content node 320 and content node 320 responsively initiates communication with end user device 330 over control node 310.

Although content node 320 ideally handles the entire communication for control node 310, the communication between control node 310 and content node 320 may be interrupted. Accordingly, as illustrated in operational scenario 301, when a service interruption is identified, control node 310 identifies an alternative content node 321 to handle the communication with end user device 330. To accomplish this task, the ARP table that maps the virtual next hop network addresses to MAC addresses may be modified. Thus, instead of mapping to content node 320, the virtual next hop address may map to a new MAC address associated with content node 321, allowing the communication to continue using the alternative content node.

Figure 4:
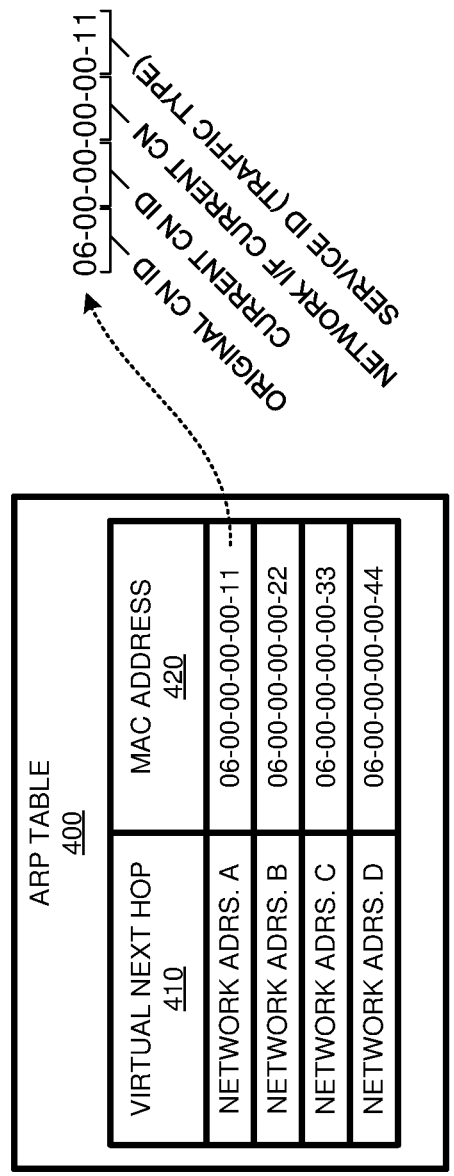
FIG. 4 illustrates an Address Resolution Protocol table for directing communications on a control node.

As a further illustration of mapping end user devices to content nodes, FIG. 4 is included. FIG. 4 illustrates an Address Resolution Protocol (ARP) table 400 for directing communications to a content node. ARP table 400 includes virtual next hop network addresses 410 and MAC addresses 420. ARP table 400 is an example table for directing communications for an end user device to one or more content nodes connected to the control node. Although illustrated with MAC addresses in the present example, it should be understood that any link layer technology may be used in routing or directing the communications, and should not be limited to the Ethernet protocols.

In operation, a control node distributes content requests from end user devices to various content nodes. To accomplish this task, the control node is configured with one or more IP addresses to handle content requests to the content nodes. Once requests are received using the one or more IP addresses, the control node disperses the requests amongst the available content nodes using an ECMP module or some other balancing process that balances the load amongst the available nodes. In some examples, such as that displayed in FIG. 4, the balancing process may select a virtual next hop network address in virtual next hop network addresses 410. Once a next hop is selected the communication mapped using the address, ARP table 400 is used to associate the next hop to a MAC address in MAC addresses 420 to handle the content request. For instance, a content request may be received by a control node and may be directed to virtual next hop network address A in virtual next hop network addresses 410. Once the next hop is identified, the content request may be forwarded to the content node corresponding to MAC address 06-00-00-00-00-11 in MAC addresses 420.

Although not illustrated in the present example, the content nodes linked by MAC addresses 420 may become unavailable or service may be interrupted between the control node and one or more of the content nodes. Accordingly, when this occurs, the MAC addresses 420 in ARP table 400 may be modified to change the destination content node for a communication. For example, an original communication may use 06-00-00-00-00-11, but when the content node becomes unavailable, the address may change to 06-00-00-00-00-21, not illustrated, which corresponds to an alternative content node.

In some examples, the MAC addresses supplied in ARP table 400 may contain encoded information regarding the content requests. Such information may include the identity of the original content node, the identity of the current content node, the network interface for the current content node, the type of traffic for the communication, or any other similar information. In some instances, to encode the information in a MAC address, certain digits may be given to identify the original content node, certain digits may be used to identify the other content node, and the other digits may be space fillers or contain further encoded information about the communication.

Figure 5:
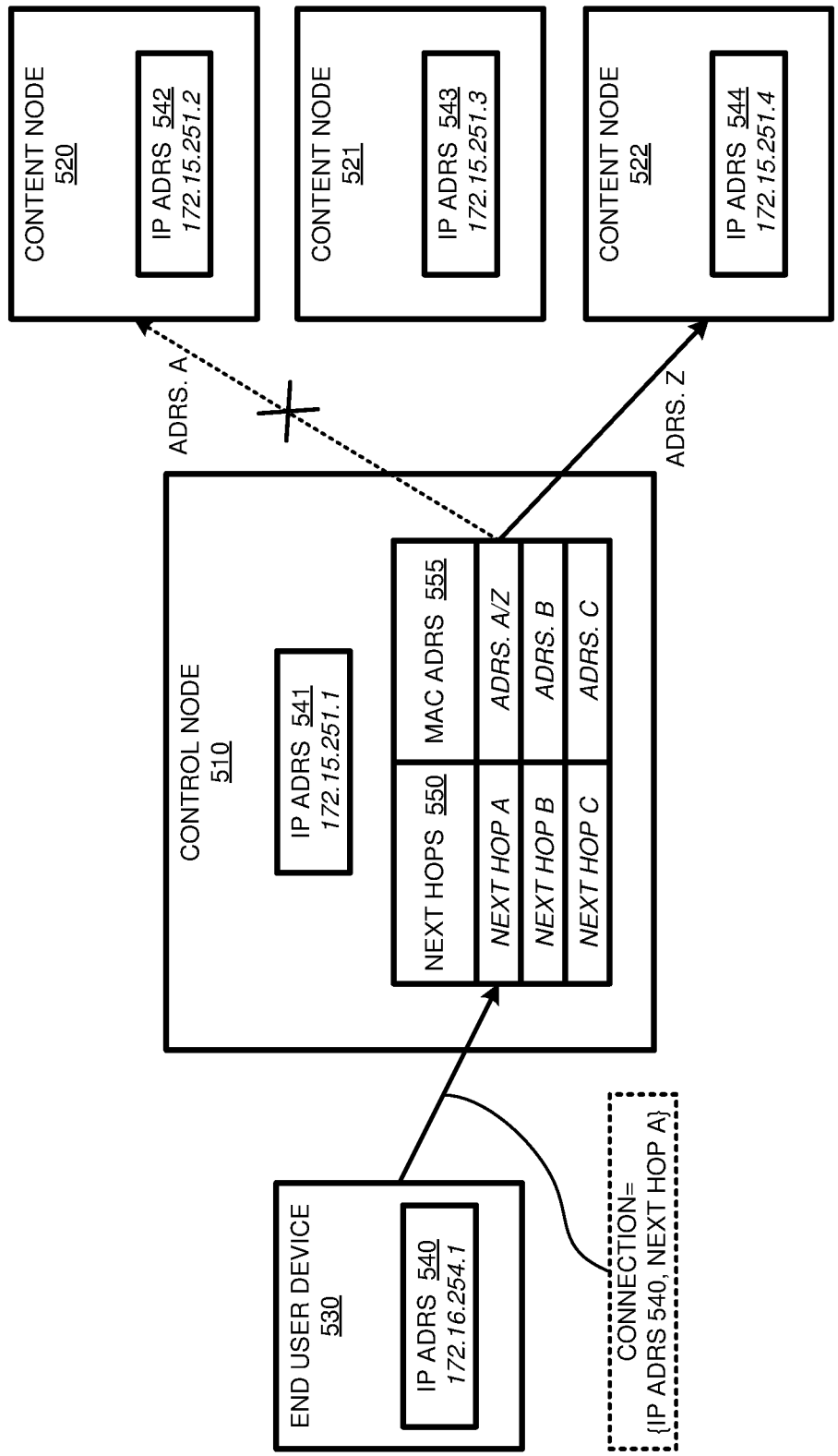
FIG. 5 illustrates an overview for directing content communications during a content node interruption.

To further illustrate the transition to an alternative content delivery node, FIG. 5 is provided. FIG. 5 illustrates an overview 500 for directing content communications during a content node interruption. Overview 500 includes control node 510, content nodes (content nodes) 520-522, and end user device 530. Control node 510, content nodes 520-522, and end user device 530 each correspond to different IP address 540-544. Control node 510 further includes next hops 550 and MAC addresses 555.

In operation, end user device 530 may require content for an application or process on end user device 530. When this requirement occurs, end user device 530 contacts control node 510 using IP address 541, which is a shared IP address for all content nodes connected to the control node. Once the content request arrives, control node 510 maps a connection between end user device 510 and one of the content nodes 520-522. This connection may be defined by at least a network address end user device, IP address 540, and a virtual next hop network address, which comprises a virtual destination IP address, next hop A. Using the present example, next hop A is first associated with address A in MAC addresses 555. Accordingly, content node 520 initially handles the content requests for end user device 530.

Although configured to handle the entire content request by end user device 530, the communication with content node 520 may be interrupted in some examples. This interruption may occur due to an issue on content node 520, an issue with the path between control node 510 and content node 520, or for any other reason. Responsive to detecting an interruption in the communication with content node 520, control node 510 may modify the communication path for the end user device. Again referring to the present example, next hop A is reconfigured to be directed to MAC address Z in MAC address 555. This new MAC address allows end user device 530 to communicate with content node 522 during the interruption of content node 520.

In some examples, content nodes 520-522 may use the MAC addresses to identify the type of communication from the incoming end user devices. For example, using content node 522, when all content nodes are executing properly, content node 522 may receive communications from end user devices using one or more normal MAC addresses on control node 510. However, as a content node is interrupted, such as content node 520, other special MAC addresses may be used to identify that communications are being passed or "drained" from the content node with an issue. This allows content node 522 to attempt to sync the communication with the draining devices, reject the communication from the incoming devices, or redirect the communication of the incoming devices. In some instances, the special MAC addresses include one or more digits that are used to define information about the communication. Such information may include an identifier of the original content node, an identifier of the current content node, as well as other information that could be useful in identifying the type of communication.

Although not illustrated in the present example, MAC addresses 555 could be further updated when all of the end user devices have been directed to other content nodes. Accordingly, address Z may be used during the draining period, however, address Z may be modified into a different address to notify content node 522 that no further transitioning devices should be expected.

Figure 6:
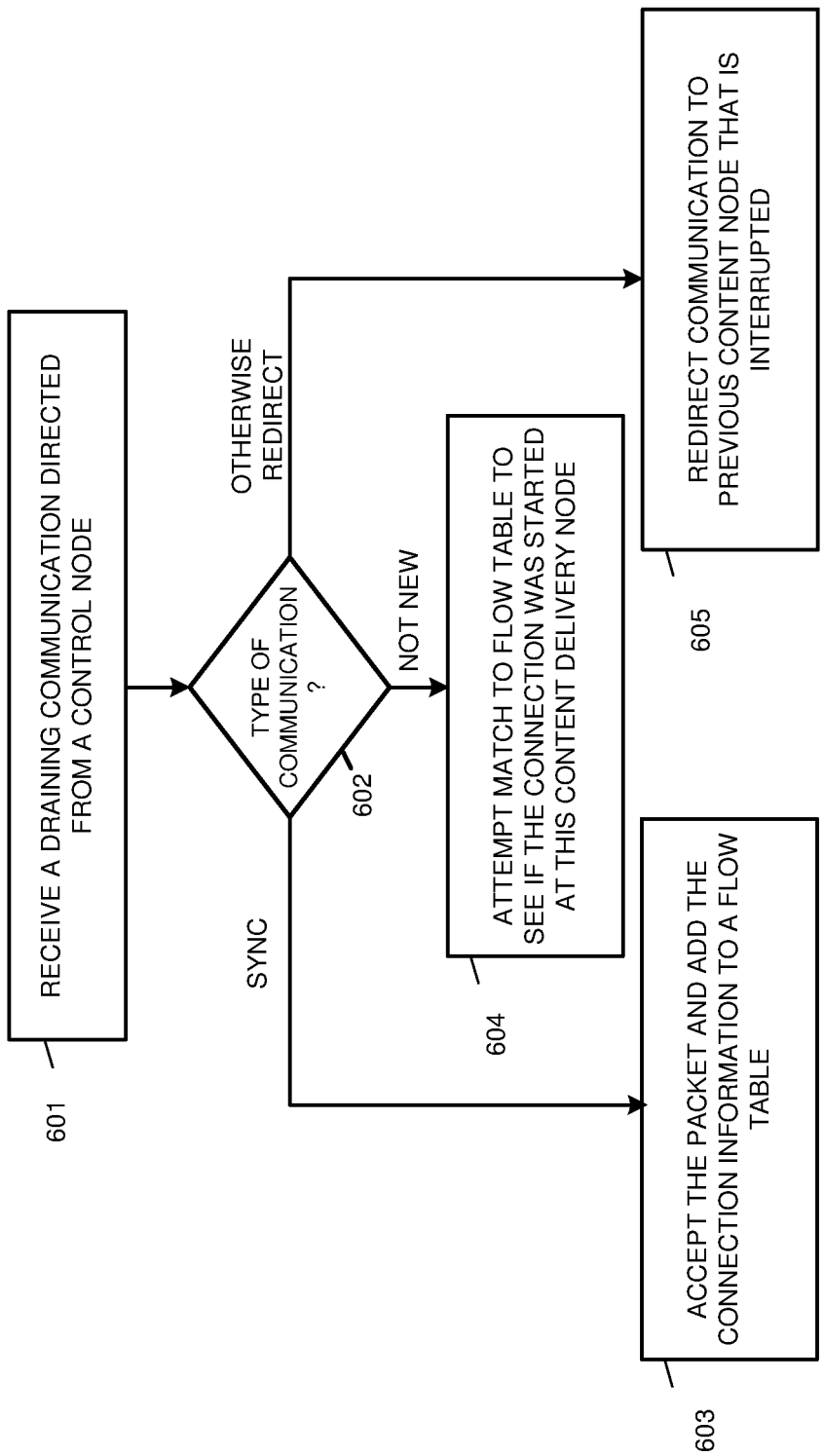
FIG. 6 illustrates an operation of a content node during a content node interruption.

To further describe the operation of a content delivery node during the draining process, FIG. 6 is provided. FIG. 6 illustrates an operation of a content delivery node during a content node interruption. The operation of FIG. 6 is described parenthetically in the description below.

In operation, one or more content nodes are communicatively connected to a control node that directs content requests from end user devices to the content nodes. To provide the content, virtual next hop network addresses are employed within the control node to direct the communications between the end user devices and the appropriate content node. These virtual next hop addresses may comprise virtual IP network addresses that are mapped using a table or some other data structure to MAC addresses associated with the various content nodes.

Under normal operation, the MAC addresses direct the requests to each of the content nodes and the content nodes respond with the requested data. However, for any number of reasons, one or more content nodes connected to the control node may fail or have the connection interrupted with the control node. As a result, the control node is configured to "drain" or redirect the communications to the still available content nodes.

As illustrated, a remaining content node is configured to receive a draining communication from a control node (601). In some examples, to identify the draining communication, the content node identifies the MAC address that was used for the communication. For instance, if two content nodes are connected to a control node they may each have one or more normal MAC addresses that are used when neither content node is interrupted. However, when a content node is interrupted, the control node may direct the communications using special "draining" MAC addresses that indicate that the communication is from the alternative content node.

Responsively, the content node identifies the type of communication for the draining communication (602). If the draining communication includes a synchronization packet, then the content node accepts the packet and adds the connection information to a flow table that is stored on the content node (603). If the draining communication does not include the synchronization packet, then the node attempts to match the communication to the flow table to see if the connection was started at this content node (604). Otherwise, the content node redirects the draining communication to the content node with the original MAC address for the communication (605). For example, a communication may not include a synchronization packet or have been started on the present content node. Accordingly, the content node redirects the communication to the content node at the original MAC address for the communication.

Figure 7:
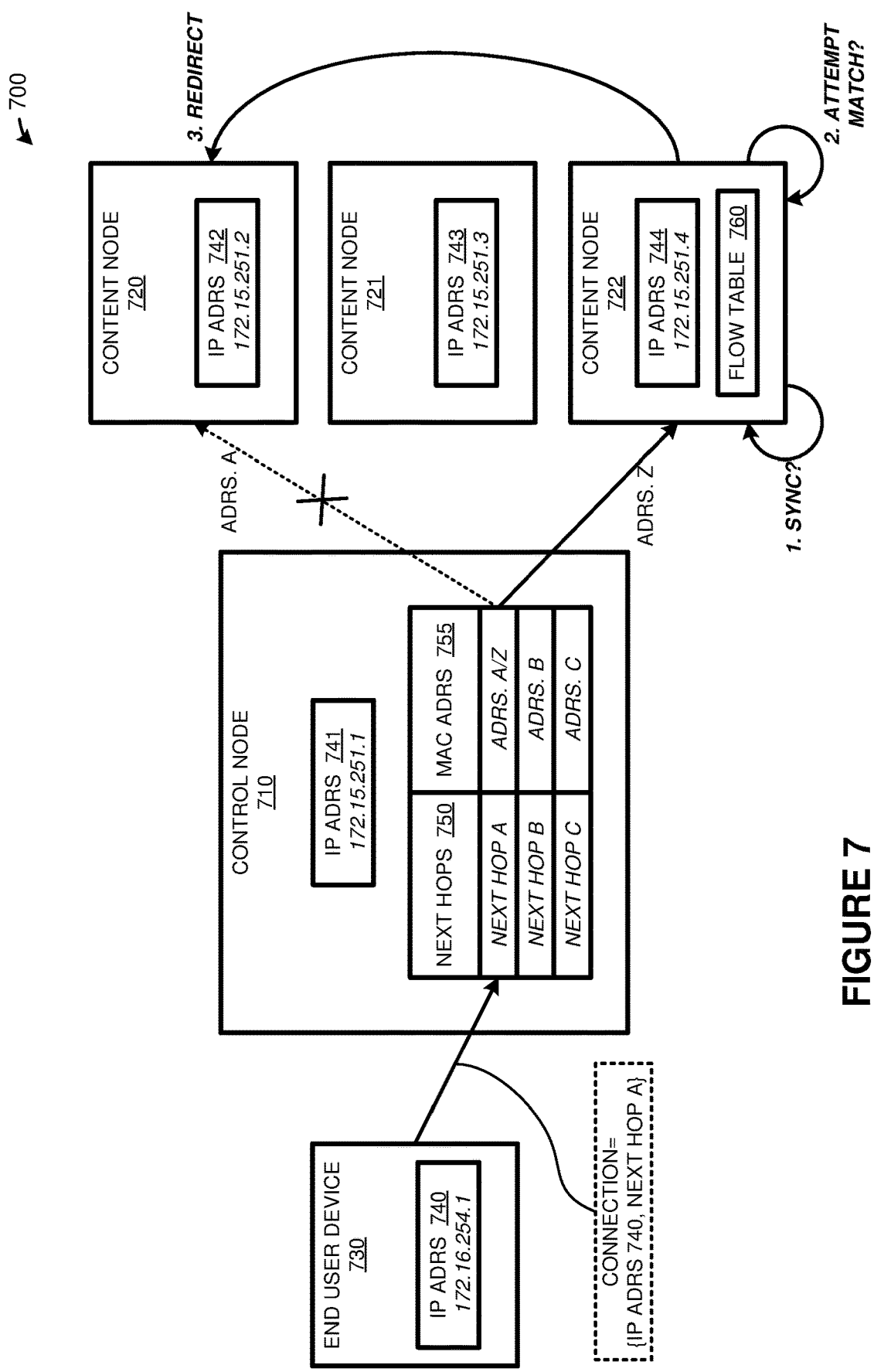
FIG. 7 illustrates an overview of operating a content node during a failover from another content node.

Turning to FIG. 7, FIG. 7 illustrates an overview 700 of operating a content node during a failover from another content node. Overview 700 includes control node 710, content nodes (content nodes) 720-722, and end user device 730, which each includes IP addresses 740-744. Control node 710 further includes next hop network addresses 750, which correspond MAC addresses 755. content node 722 further includes flow table 760 to manage the connections with the end user devices.

In operation, end user device 730 initiates a content request to control node 710. Once the content request is identified by control node 710, the request is mapped to one of content nodes 720-722 using virtual next hop network addresses 750. These virtual addresses are fake or fabricated by control node 710 to establish a connection, but allow the connection to be routed to the various content nodes. For example, as illustrated, end user device 730 establishes a communication with next hop network address A in next hop network addresses 750. However, the communication is not directed to this next hop network address, as the destination does not exist. Instead, the next hop network address is mapped to a MAC network address in MAC addresses 755. Once the MAC address is identified, the content request is directed to the corresponding content node associated with the MAC address. In the present example, the initial MAC address for the content request is address A. Thus, content node 720 is configured to respond to the content requests of end user device 730.

Although content node 720 may provide all of the content necessary for end user device 730 under normal conditions, in some examples, an interruption may occur between control node 710 and content node 720. This interruption may occur as a result of a communication link failure between control node 710 and content node 720, may occur as a result of a failure of content node 720, or any other similar interruption between control node 710 and content node 720. In some examples, content nodes 720-722 are configured to transfer status updates to control node 710, however, in other examples, control node 710 may periodically query content nodes 720-722 to determine the availability of the nodes.

Once an interruption is determined in the communication path between control node 710 and content node 720, control node 710 is configured to "drain" or transfer the communications from content node 720 to another communicatively coupled content node. In the present instance, for end user device 730, next hop A within next hop network addresses 750 transitions to being associated with address Z in MAC addresses 755. Accordingly, rather than being directed to content node 720, end user device 730 will be directed to content node 722.

Based on MAC address Z, content node 722 identifies that the communication from end user device 730 is a draining communication from another content delivery node. Accordingly, content node 722 attempts to identify if the communication contains a synchronization message, which would allow the communication from end user device 730 to be added to content node 722 and flow table 760. However, if no synchronization message is included, content node 722 may attempt to match the communication from end user device 730 to a communication that is already initiated on the content node, and handle the communication based on the matching. These previously initiated communications may appear within flow table 760, which manages the communications that are handled by the content node. If the flow table is searched and the communication cannot be identified, control node 722 may then redirect the communication to the original content node 720 to allow the original content node to handle the content request for end user device 730.

Although illustrated in the present example with three content nodes, it should be understood that control node 710 might communicate with any number of content nodes to direct content requests.

Turning to FIG. 8, FIG. 8 illustrates a flow table 800 for a content node. Flow table 800 includes source address 810, destination address 820, source port 830, destination port 840, and other information 850. Other information 850 may include the protocol for the communication, a data unit count, a time stamp field, or other similar information. Although illustrated in the present example with five columns, it should be understood that flow table 800 might contain additional, fewer, or different fields. In some examples, source address 810 may be the IP address for the end user device making the communication, and destination address 820 may be the virtual next hop network address used in the communication for the end user device.

In operation, content nodes are configured to receive content requests from various end user devices. As the requests are received, the communications may be logged into flow table 800 to maintain and keep track of the various connecting devices. In the present example, when another content node fails, the replacement content node is configured to identify communications that are drained from the failed content node. Once a draining communication is identified, the replacement content node attempts to identify a synchronization message in the communication. If a synchronization message is included then the new communication is added to flow table 800. If, however, a synchronization code is not present, then the replacement content node attempts to match the communication with a communication that has previously been logged in table 800 to determine how to handle the communication. If the communication is logged in table 800, then the replacement content node accepts the communication. In contrast, if the communication is not in table 800 then the communication is routed back to the failed content node using the appropriate MAC address for the node.

Figure 9:
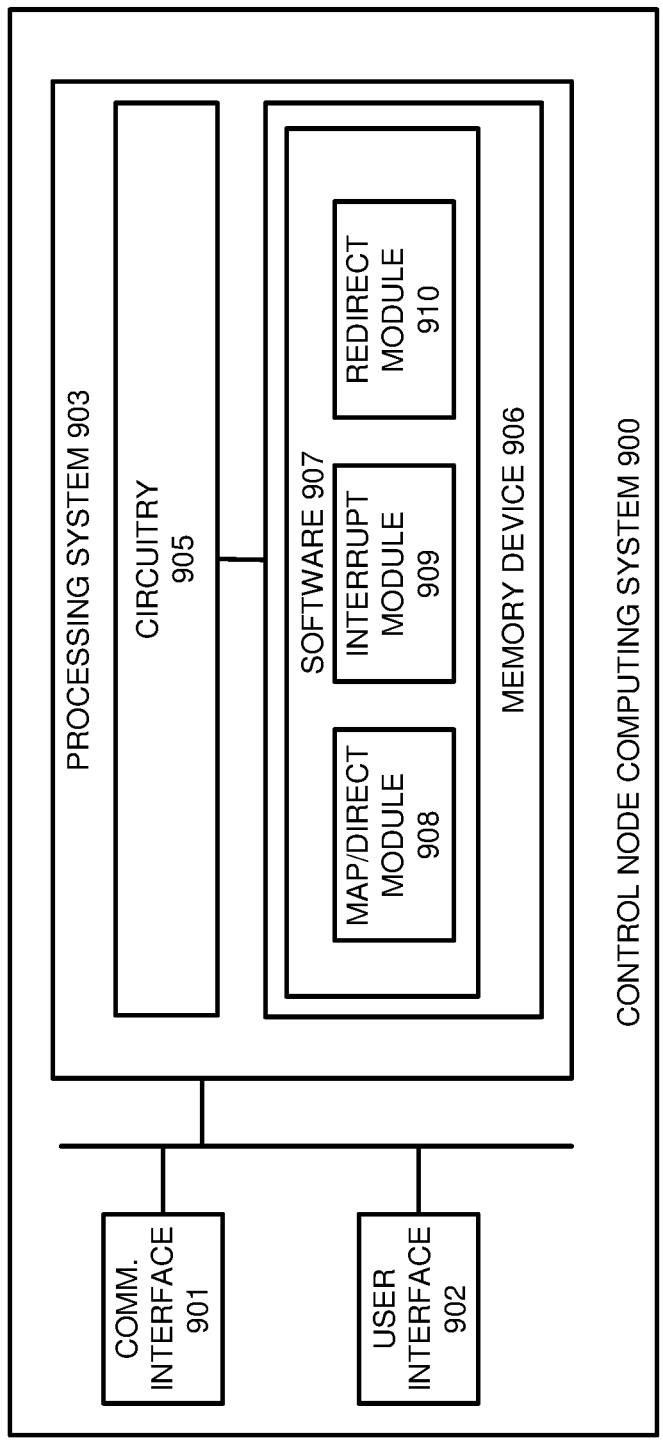
FIG. 9 illustrates a control node computing system for handling content node interruptions.

Referring now to FIG. 9, FIG. 9 illustrates a control node computing system 900 for handling control node interruptions. Control node computing system 900 is an example of control nodes 130, 310, 510, and 710, although other examples may exist. Control node computing system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof. Here, communication interface 901 communicates with one or more content nodes that are used to provide content for end user devices, and further communicates with the requesting end user devices. Accordingly, computing system 900 acts as a switch or intermediary between the content nodes and the requesting devices.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes map/direct module 908, interrupt module 909, and redirect module 910. Operating software 907 may further include an operating system, utilities, drivers, network interfaces, applications, or some other type of software. When executed by circuitry 905, operating software 907 directs processing system 903 to operate control node computing system 900 as described herein.

In particular, communication interface 901 receives content requests from various end user devices requesting content from communicatively coupled content nodes. Once a request is received, map/direct module 908 maps a first connection between the end user device an a first content node, wherein the first connection is defined by at least a network address of the end user device and a virtual next hop address. In some examples, computing system 900 includes an ARP table, which is used to balance the mapping of end user devices to corresponding content nodes. Once a connection is mapped for the end user device, map/direct module 908 directs traffic associated with the first connection to the first content node using at least a virtual next hop network address from the ARP table.

While directing the communications, interrupt module 909 identifies an interruption in the communication between control node computing system 900 and the first content node. This interruption may occur as a result of a failure of the communication link, as a result of a failure within the content node itself, or any other possible interruption between the computing system 900 and the first content node. Responsive to identifying the interruption, redirect module 910 identifies a second content node to handle the first connection and directs the traffic associated with the first connection to the second content node using at least the virtual next hop network address.

In some instances, the virtual next hop network addresses within the ARP table do not correspond to any physical device, but are instead associated with MAC addresses that actually correspond to the various content nodes. As a result, the virtual next hop network addresses are a different IP address than the content nodes they virtually represent.

Figure 10:
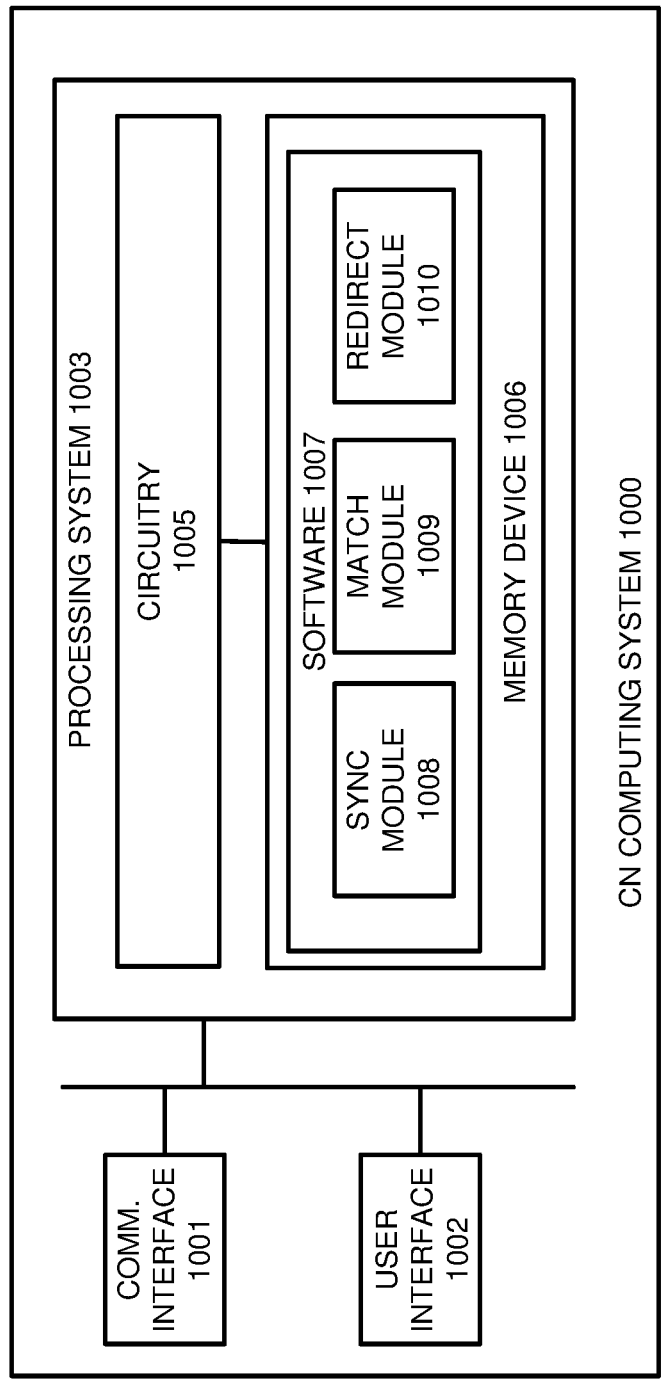
FIG. 10 illustrates a content node computing system for handling data communications from an interrupted content node.

Referring now to FIG. 10, FIG. 10 illustrates a content node (content node) computing system 1000 for handling data communications from an interrupted content node. content node computing system 1000 is an example of content nodes 120-123, 320-321, 520-522, and 720-722, although other examples may exist. content node computing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof. Communication interface 1001 communicates with at least one control node to receive and respond to content requests from end user devices.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes synchronization module 1008, match module 1009, and redirect module 1010. Operating software 1007 may further include an operating system, utilities, drivers, network interfaces, applications, or some other type of software. When executed by circuitry 1005, operating software 1007 directs processing system 1003 to operate content node computing system 1000 as described herein.

Specifically, communication interface 1001 receives a draining communication from a control node. This draining communication may be identified by the MAC address that was used to communicate with computing system 1000. In response to the draining communication, synchronization module 1008 identifies if a synchronization message is included in the communication. If a synchronization message is included, the communication is added to a flow table that is used manage the connections with the communication. If a synchronization message is not included, match module 1009 attempts to match the communication to a prior communication that was initiated in computing system 1000. If a match is found then the communication is processed using computing system 1000, however, if a match is not found the communication is redirected to the original content node for the communication.

For example, a content communication may initiate with an original MAC address for a first content node. However, if the first content node fails, the MAC address may be changed to move the communication to a second content node. Once the communication arrives at the second content node, and does not include a synchronization message or match to a communication on the second node, the communication is forwarded to the original MAC address.

Although illustrated in the present example with three software modules for both control node computing system 900 and content node computing system 1000, it should be understood that any number of software modules might provide the same functionality.

Figure 11:
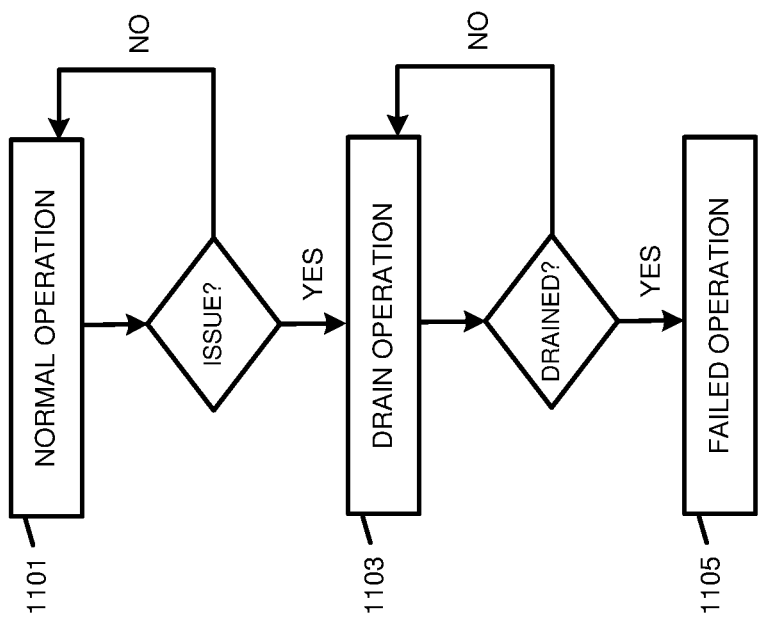
FIG. 11 illustrates a flow diagram for operating a control node to direct communications to content nodes in a content delivery network.

FIG. 11 illustrates a flow diagram for operating a control node to direct communications to content nodes in a content delivery network. As depicted, the control node initially starts in normal operation 1101. Normal operation 1101 allows the control node to receive content requests from end user devices and distribute the requests amongst the content nodes communicatively coupled to the control node. In addition to directing communications, the control node is further configured to identify issues with the various content nodes. If an issue is not present, the control node will continue in normal operation 1101. However, if an issue is present with a content delivery node, the control node will initiate drain operation 1103 to transfer communications from the problematic node to the one or more remaining nodes.

In some examples, the draining process may be accomplished using at least virtual next hop network addresses and MAC addresses in an ARP table. During normal operation 1101, communications are configured for an end user device using the IP address for the end user device and a virtual next hop network address that is mapped on the control node. In turn, the virtual next hop network address is associated via a table, such as ARP table 400 or some other data structure, to a MAC address for a content node. Accordingly, when one of the content nodes fails, the MAC addresses to the failed content node may need to be modified to direct communications to alternative content nodes. In some instances, the MAC address may include information, such as an identifier for the current content node, an identifier for the original content node, or any other related information about the communication. Thus, during drain operation 1103, the current content node portion of the MAC addresses may be modified to a remaining content node.

Once all of the communications have been drained or transferred to alternative content nodes, the control node may transfer to failed operation 1105. This new operation may again modify the MAC addresses in the ARP table to notify the remaining content nodes that all communications have been transferred and they no longer need to look for draining communications from problematic content node.

Although not illustrated in the present example, it should be understood that at any point the control node might identify that the problematic content node has returned to being available. As such, the control node may again route communications to the problematic content node to balance the content request load. Further, although illustrated in FIGS. 1-11 using special MAC addresses to route communications from the control node to the various content nodes, it should be understood that any similar link layer protocol addressing scheme may be used by the control node.

Returning to the elements of FIG. 1, content nodes 120-123 each comprise one or more devices capable of caching and providing content to end user devices. Each content node 120-123 may include processing systems, storage systems, user interfaces, communication interfaces, power supplies, or any other computer related systems. Examples of content nodes 120-123 include server computers, desktop computers, laptop computers, or other similar computing devices.

Control node 130 comprises one or more devices capable of directing communications between content nodes 120-123 and end user devices 140-142. Control node 130 may include processing systems, storage systems, user interfaces, communication interfaces, power supplies, or any other computer related systems. Examples of control node 130 include server computers, desktop computers, laptop computers, or other similar computing devices.

Origin servers 150-152 each comprise one or more devices capable of caching and providing content to end user devices. Each content node 120-123 may include processing systems, storage systems, user interfaces, communication interfaces, power supplies, or any other computer related systems. Examples of content nodes 120-123 include server computers, desktop computers, laptop computers, or other similar computing devices.

End user devices 140-142 each represent a computing device capable of requesting content from content nodes 120-123. End user device 140-142 may each include processing systems, storage systems, user interfaces, communication interfaces, power supplies, or any other computer related systems. End user devices 140-142 may each represent a telephone, tablet, computer, e-book, mobile Internet appliance, wireless network interface card, media player, game console, or some other end user computing apparatus.

Communication links 160-165 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 160-165 could be direct links or may include intermediate networks, systems, or devices.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein can be in the form of a functional diagram, operational sequence, or flow diagram, and can be described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology can be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above.

What is claimed is:

1. A method of handling server failovers in data centers, the method comprising:

in a server, receiving a communication and determining whether the communication comprises a synchronization packet;

in the server, and in response to determining that the communication does not comprise a synchronization packet, attempting to match the communication to one or more connections in a flow table; and in the server, and in response to failing to match the communication to at least one connection in the flow table, redirecting the communication to a different server identified by an address indicated in the communication.

2. The method of claim 1 further comprising, in the server, and in response to determining that the communication comprises a synchronization packet, adding a connection for the communication to the flow table.

3. The method of claim 2 further comprising, in the server, serving content to an end-user device requested by the communication.

4. The method of claim 3 wherein receiving the communication comprises receiving the communication from a load balancer.

5. The method of claim 4 further comprising, in the load balancer, directing the communication to a media access control address for the server.

6. The method of claim 5 wherein the address indicated in the communication comprises a different media access control address for the different server.

7. The method of claim 6 further comprising, in the load balancer:

receiving the communication from the end-user device at a virtual network address associated with the different server; and directing the communication to the server in response to the different server having entered a failover state.

8. A server computer comprising:

a means for receiving a communication and determining whether the communication comprises a synchronization packet;

a means for, in response to determining that the communication does not comprise a synchronization packet, attempting to match the communication to one or more connections in a flow table; and a means for, in response to failing to match the communication to at least one connection in the flow table, redirecting the communication to a different server identified by an address indicated in the communication.

9. The server computer of claim 8 further comprising a means for, in response to determining that the communication comprises a synchronization packet, adding a connection for the communication to the flow table.

10. The server computer of claim 9 further comprising a means for serving content to an end-user device requested by the communication.

11. The server computer of claim 10 wherein the means for receiving the communication receives the communication from a load balancer at a media access control address for the server in response to the different server having entered a failover state.

12. The server computer of claim 11 wherein the address indicated in the communication comprises a different media access control address for the different server.

13. A server comprising:

one or more computer readable storage media;

one or more processors operatively coupled with the one or more computer readable storage media; and program instructions stored on the one or more computer readable storage media for handling server failovers that, when executed by the one or more processors, direct the server to at least:

receive a communication and determining whether the communication comprises a synchronization packet;

in response to determining that the communication does not comprise a synchronization packet, attempt to match the communication to one or more connections in a flow table; and in response to failing to match the communication to at least one connection in the flow table, redirect the communication to a different server identified by an address indicated in the communication.

14. The server of claim 13 wherein the program instructions further instruct the server to, in response to determining that the communication comprises a synchronization packet, add a connection for the communication to the flow table.

15. The server of claim 14 wherein the program instructions further instruct the server to serve content to an end-user device requested by the communication.

16. The server of claim 15 wherein the server receives the communication from a load balancer.

17. The server of claim 16 wherein the communication comprises an Internet protocol packet sent by the load balancer to a media access control address for the server.

18. The server of claim 17 wherein the address indicated in the communication comprises a different media access control address for the different server.

19. The server of claim 18 wherein the Internet protocol packet includes a virtual network address associated with the different server.

20. The server of claim 19 wherein the program instructions further direct the server to obtain the content from an origin server and cache the content for subsequent requests for the content.

* * * * *